US009061527B2

(12) United States Patent
Tobin et al.

(10) Patent No.: US 9,061,527 B2
(45) Date of Patent: Jun. 23, 2015

(54) THERMAL PRINTER WITH SINGLE LATCH, ADJUSTABLE MEDIA STORAGE AND CENTERING ASSEMBLIES AND PRINT ASSEMBLY

(71) Applicant: Datamax-O'Neil Corporation, Orlando, FL (US)

(72) Inventors: Dwayne Steven Tobin, Longwood, FL (US); William M. Bouverie, Windermere, FL (US); William C. Bouverie, Ocoee, FL (US)

(73) Assignee: Datamax-O'Neil Corporation, Orlando, FL (US)

( * ) Notice: Subject to any disclaimer, the term of this patent is extended or adjusted under 35 U.S.C. 154(b) by 14 days.

(21) Appl. No.: 14/099,295

(22) Filed: Dec. 6, 2013

(65) Prior Publication Data

US 2014/0160219 A1 Jun. 12, 2014

Related U.S. Application Data

(60) Provisional application No. 61/734,406, filed on Dec. 7, 2012.

(51) Int. Cl.
*B41J 29/02* (2006.01)
*B41J 15/04* (2006.01)
*B41J 11/00* (2006.01)
*B65H 19/12* (2006.01)

(52) U.S. Cl.
CPC .............. *B41J 11/0045* (2013.01); *B41J 15/04* (2013.01); *B65H 19/126* (2013.01)

(58) Field of Classification Search
USPC .............. 347/222, 171, 197; 400/120.16, 613, 400/691
See application file for complete search history.

(56) References Cited

U.S. PATENT DOCUMENTS

| | | | |
|---|---|---|---|
| 4,143,977 A | 3/1979 | Kurihara et al. |
| 4,177,731 A | 12/1979 | Kleist et al. |
| 4,788,558 A | 11/1988 | Caldwell et al. |
| 4,788,559 A | 11/1988 | Ende |
| 4,872,659 A | 10/1989 | Kato et al. |
| 4,924,240 A | 5/1990 | Herbert et al. |
| 4,991,846 A | 2/1991 | Sondej |

(Continued)

OTHER PUBLICATIONS

Written Opinion of the International Searching Authority, PCT/US2012/036297, Jul. 17, 2012.

(Continued)

*Primary Examiner* — Huan Tran
(74) *Attorney, Agent, or Firm* — Carter, Deluca, Farrell & Schmidt, LLP (57) ABSTRACT

A direct thermal printer including a latch assembly, a media storage assembly, a media centering assembly, a print assembly, and a temperature sensing member. The latch assembly includes a single latch lever in mechanical communication with latch tabs disposed in the cover of the printer that are received by openings in the base of the printer to engage and disengage the cover from the base. The media storage assembly includes media guides with removable tabs having more than one available position to provide storage of different size media. The media centering assembly includes pulley assemblies that bias the media guides towards each other to secure media between the media guides. The print assembly includes a platen disposed in the base of the printer having cams on each end that are rotatable and positioned to adjust printing characteristic of a printhead disposed in the cover.

20 Claims, 8 Drawing Sheets

(56) References Cited

U.S. PATENT DOCUMENTS

| | | |
|---|---|---|
| 5,028,155 A | 7/1991 | Sugiura et al. |
| 5,087,137 A | 2/1992 | Burnard et al. |
| 5,206,662 A | 4/1993 | Fox et al. |
| 5,326,182 A | 7/1994 | Hagstrom |
| 5,397,192 A | 3/1995 | Khormaee |
| 5,468,076 A | 11/1995 | Hirano et al. |
| 5,490,638 A | 2/1996 | Driftmyer et al. |
| 5,564,841 A | 10/1996 | Austin et al. |
| 5,600,350 A | 2/1997 | Cobbs et al. |
| 5,650,730 A | 7/1997 | Herbst, Jr. |
| 5,684,516 A | 11/1997 | Cseledy et al. |
| 5,790,162 A | 8/1998 | Adams et al. |
| 5,820,280 A | 10/1998 | Fox |
| 5,836,704 A | 11/1998 | Lau et al. |
| 5,870,114 A | 2/1999 | Numata et al. |
| 5,872,585 A | 2/1999 | Donato et al. |
| 5,874,980 A | 2/1999 | West |
| 5,909,233 A | 6/1999 | Hamman et al. |
| 5,927,875 A | 7/1999 | Lau et al. |
| 5,978,004 A | 11/1999 | Ehrhardt |
| 5,995,128 A | 11/1999 | Adams et al. |
| 6,014,229 A | 1/2000 | Yun |
| 6,020,906 A | 2/2000 | Adams et al. |
| 6,034,708 A | 3/2000 | Adams et al. |
| 6,057,870 A | 5/2000 | Monnier et al. |
| 6,070,048 A | 5/2000 | Nonaka et al. |
| 6,082,914 A | 7/2000 | Barrus et al. |
| 6,095,704 A | 8/2000 | Jaeger et al. |
| 6,099,178 A | 8/2000 | Spurr et al. |
| 6,129,463 A | 10/2000 | Lau et al. |
| 6,201,255 B1 | 3/2001 | Torchalski et al. |
| 6,283,024 B1 | 9/2001 | George |
| 6,289,730 B1 | 9/2001 | Elgee |
| 6,302,604 B1 | 10/2001 | Bryant et al. |
| 6,389,241 B1 | 5/2002 | Cernusak et al. |
| 6,396,070 B1 | 5/2002 | Christensen et al. |
| 6,520,614 B2 | 2/2003 | Kaneko |
| 6,616,362 B2 | 9/2003 | Bouverie et al. |
| 6,825,864 B2 | 11/2004 | Botten et al. |
| 6,840,689 B2 | 1/2005 | Barrus et al. |
| 6,846,121 B2 | 1/2005 | Bouverie et al. |
| 6,857,714 B2 | 2/2005 | Hohberger et al. |
| 6,900,449 B2 | 5/2005 | Bolash et al. |
| 6,942,403 B2 | 9/2005 | Hohberger et al. |
| 7,042,478 B2 | 5/2006 | Bouverie et al. |
| 7,071,961 B2 | 7/2006 | Ullenius et al. |
| 7,079,168 B2 | 7/2006 | Ullenius et al. |
| 7,150,572 B2 | 12/2006 | McNestry et al. |
| 7,162,460 B2 | 1/2007 | Cleckler et al. |
| 7,205,561 B2 | 4/2007 | Chelvayohan et al. |
| 7,255,343 B2 | 8/2007 | So |
| 7,375,832 B2 | 5/2008 | Bouverie et al. |
| 7,456,995 B2 | 11/2008 | Stephens |
| 7,502,042 B2 | 3/2009 | Hitz et al. |
| 7,537,404 B2 | 5/2009 | Bouverie et al. |
| 7,600,684 B2 | 10/2009 | Tobin et al. |
| 7,667,874 B2 | 2/2010 | MacDonald et al. |
| 7,699,550 B2 | 4/2010 | Bouverie et al. |
| 7,824,116 B2 | 11/2010 | Lyman |
| 7,845,632 B2 | 12/2010 | Windsor et al. |
| 7,857,414 B2 | 12/2010 | Eun et al. |
| 7,876,223 B2 | 1/2011 | Yamaguchi et al. |
| 7,891,892 B2 | 2/2011 | Chiu |
| 7,907,159 B2 | 3/2011 | Matsuo et al. |
| 7,934,881 B2 | 5/2011 | Lodwig et al. |
| 7,938,501 B2 | 5/2011 | Takamiya et al. |
| 8,142,087 B2 | 3/2012 | Kugimachi |
| 2001/0008612 A1 | 7/2001 | Liljestrand et al. |
| 2003/0081024 A1 | 5/2003 | Vives et al. |
| 2003/0141655 A1 | 7/2003 | Bryer |
| 2004/0008365 A1 | 1/2004 | Hobbs |
| 2004/0114024 A1 | 6/2004 | Bouverie et al. |
| 2004/0165927 A1 | 8/2004 | Fisher et al. |
| 2005/0002715 A1 | 1/2005 | Fries et al. |
| 2005/0189693 A1 | 9/2005 | Ko |
| 2005/0190368 A1 | 9/2005 | Ehrhardt et al. |
| 2005/0204940 A1 | 9/2005 | Elliott et al. |
| 2006/0007295 A1 | 1/2006 | Ueda |
| 2006/0024114 A1* | 2/2006 | Lyman et al. ............... 400/613 |
| 2006/0045601 A1 | 3/2006 | Endo |
| 2006/0055721 A1 | 3/2006 | Burdette et al. |
| 2006/0157911 A1 | 7/2006 | Learmonth et al. |
| 2006/0159504 A1 | 7/2006 | Blanchard et al. |
| 2006/0180737 A1 | 8/2006 | Consiglio |
| 2007/0022233 A1 | 1/2007 | Bridges et al. |
| 2007/0040326 A1 | 2/2007 | Noda et al. |
| 2007/0059078 A1 | 3/2007 | Silverbrook et al. |
| 2007/0138738 A1 | 6/2007 | Motohashi et al. |
| 2009/0038495 A1 | 2/2009 | Butzen et al. |
| 2009/0103806 A1 | 4/2009 | Nakami |
| 2009/0244584 A1 | 10/2009 | McGarry et al. |
| 2010/0066782 A1 | 3/2010 | Yamamoto et al. |
| 2010/0169513 A1 | 7/2010 | Levin |
| 2010/0247222 A1 | 9/2010 | Bouverie et al. |
| 2010/0319561 A1 | 12/2010 | Colquitt et al. |
| 2011/0042883 A1 | 2/2011 | Wang et al. |
| 2011/0132643 A1 | 6/2011 | Hattori et al. |
| 2012/0155946 A1* | 6/2012 | Colonel et al. ............... 400/691 |
| 2013/0314721 A1* | 11/2013 | Colonel et al. ............... 358/1.1 |

OTHER PUBLICATIONS

Written Opinion of the International Searching Authority, PCT/US2012/039043, Aug. 3, 2012.
Written Opinion of the International Searching Authority, PCT/US2012/041093, Aug. 7, 2012.
Written Opinion of the International Searching Authority, PCT/US2012/043734, Sep. 21, 2012.
Written Opinion of the International Searching Authority, PCT/US2012/043709, Sep. 21, 2012.
Written Opinion of the International Searching Authority, PCT/US2012/043772, Sep. 14, 2012.
Written Opinion of the International Searching Authority, PCT/US2012/046712, Oct. 5, 2012.
Written Opinion of the International Searching Authority, PCT/US2012/049417, Nov. 2, 2012.
Written Opinion of the International Searching Authority, PCT/US2012/050938, Nov. 6, 2012.
Written Opinion of the International Searching Authority, PCT/US2012/060956, Jan. 11, 2013.
Written Opinion of the International Searching Authority, PCT/US2012/066291, Feb. 5, 2013.

* cited by examiner

THERMAL PRINTER WITH SINGLE LATCH, ADJUSTABLE MEDIA STORAGE AND CENTERING ASSEMBLIES AND PRINT ASSEMBLY

CROSS-REFERENCE TO RELATED APPLICATION

This application claims priority from, and the benefit of, U.S. Provisional Application Ser. No. 61/734,406, filed Dec. 7, 2012, the entirety of which is hereby incorporated by reference herein for all purposes.

BACKGROUND

1. Technical Field

The present disclosure relates generally to printers, and in particular, to a direct thermal printer with a single latch assembly, an adjustable media storage assembly guide, a media centering assembly, a print assembly, and a temperature sensing member.

2. Description of Related Art

Direct thermal printers are used to produce a printed image by selectively heating specially coated media as it passes over the printer's thermal printhead. An image is produced where the media's coating turns black in the areas where it is heated. Traditional thermal printers include a thermal printhead, which generates heat and effectively prints on the media, a platen, or roller (typically rubber), that feeds the media through the printer, a spring or similar mechanism that urges the thermal printhead toward the media to establish physical contact between the printhead and the media to facilitate thermal printing, and a controller that controls the printer.

SUMMARY

An example embodiment of the present disclosure includes a printer, such as a direct thermal printer, that comprises a housing including a cover and a base connected together with a hinge, a latch assembly disposed in the cover, a media storage assembly disposed in the base, a media centering assembly disposed in the base, a print assembly disposed in the housing, and a temperature sensing member disposed in the base.

The latch assembly includes a latch lever disposed at least in part on the exterior of the cover in mechanical communication with latch tabs also disposed in the cover such that actuation of the latch lever will simultaneously actuate the first and second latch tabs. Openings in the base of the printer are adapted to receive the latch tabs. Once inserted into the openings, actuation of the latch tabs will move the latch tabs between a locked position and an unlocked position allowing the cover to be selectively engaged and disengaged from the base.

The media storage assembly includes media guides each having tab slots for receiving removable and repositionable tabs. The media guides also include securing tabs for securing the removable and repositionable tabs in the tab slots. The removable and repositionable tabs include a male feature disposed on the face of each tab. In a first position in the tab slot, the removable and repositionable tab's male feature is in a position to hold media of a certain size. When the removable and repositionable tab is repositioned to a second position in the tab slot, the removable and repositionable tab's male feature is in a position to hold media of another inside diameter (ID) core size.

The media centering assembly includes mounting plates disposed on the media guides and pulley assembly disposed in the base. Each pulley assembly includes a belt that is attached at one end to one media guide and at the other end to the other media guide. An extension spring disposed in the base is secured to the base at a first end and to one of the mounting plates at its other end. The extension spring provides a force to bias the first media guide towards the second media guide.

The print assembly includes a printhead disposed in the cover and retained by an inner cover frame and positioned by compliant members that apply a force against a platen disposed in the base retained by a bearing and having a cam disposed at both ends of the platen. The compliant members of the printhead provide limited radial movement of the printhead along the printhead's axis. The platen's bearing provides radial movement of the platen along the platen's axis. The print assembly further includes a set screw disposed in the base and a leaf spring disposed on the platen's bearing and also in contact with the set screw. Rotation of the set screw rotates platen's cams and this rotation causes contact of the first and second cams with the printhead which positions the printhead forward along the axis of the paper motion.

The printer optionally includes a temperature sensing member disposed in the base to sense the temperature of certain components.

In another aspect, the present disclosure is directed to a media centering assembly. The media centering assembly includes a first media guide and a second media guide disposed in slidable opposition to one another and configured to support a roll of media therebetween. The media centering assembly includes a first pulley assembly having a first pulley and a first belt. The first belt is in communication with the first pulley and is operably coupled to the first media guide at a first end of the first belt, and the first belt is operably coupled to the second media guide at a second end of the first belt. The media centering assembly includes a second pulley assembly having a second pulley and a second belt, wherein the second belt is in communication with the second pulley and is operably coupled to the second media guide at a first end of the second belt, and the second belt is operably coupled to the first media guide at a second end of the second belt. An extension spring is operably coupled, at a first end of thereof, to an anchor, and the extension spring operably coupled to the first media guide at a second end of the extension spring. The extension spring is configured to bias the first media guide toward the second media guide.

In some embodiments, the media centering assembly includes a first mounting plate disposed on the first media guide, and a second mounting plate disposed on the second media guide. In some embodiments, the first belt is fixed to the first mounting plate at a first end of the first belt, and is fixed to the second mounting plate at a second end of the first belt. The second belt is fixed to the second mounting plate at a first end of the second belt, and is fixed to the first mounting plate at a second end of the second belt.

In some embodiments, the first media guide and the second media guide each include a male protrusion configured for insertion into a support tube of a media roll. In some embodiments, the male protrusion is disposed on a reversible member having a first position wherein the male protrusion is configured for insertion into a support tube of a media roll having a first diameter, and a second, reversed position, wherein the male protrusion is configured for insertion into a support tube of a media roll having a second diameter different from the first diameter. In some embodiments, the first media guide and the second media guide include a tab slot defined therein, and the reversible member includes a tab configured to selectively engage the tab slot of the corresponding first or second media guide.

In another aspect, the present disclosure is directed to a printer that includes a housing having a cover and a base connected together with a hinge. A latch assembly is disposed in the cover. The latch assembly includes a latch lever disposed at least in part on the exterior of the cover in mechanical communication with a first latch tab and a second latch tab, such that actuation of the latch lever simultaneously actuates the first and second latch tabs. The base includes first and second openings defined therein that are adapted to receive the first and second latch tabs respectively, wherein the actuation of the first and second latch tabs once inserted into the first and second openings will move the latch tabs from a locked position to an unlocked position allowing the cover to be disengaged from the base. The printer includes a print assembly disposed in the housing having a bearing disposed in the base, and an elongate cylindrical platen disposed in the base and rotatable about its longitudinal axis. The platen is retained by the bearing and the bearing facilitates rotation of the platen along the platen's longitudinal axis. The print assembly includes a first cam disposed on a first end of the platen, and, a temperature sensor disposed in the base.

In some embodiments, the printer includes a second cam disposed on a second end of the platen, a set screw disposed in the base, and, a leaf spring disposed on the second bearing and in contact with the set screw. Rotation of the set screw rotates the first and second cams and, in turn, rotation of the first and second cams causes contact of the first and second cams with a printhead. In some embodiments, an anchor slot is defined in the base that is configured to receive a portion of the leaf spring. In some embodiments, the leaf spring is configured for deflection in a transverse direction away from the platen to enable the leaf spring to move out of the anchor slot.

In some embodiments, the bearing is configured for selective removal from the platen by rotating the bearing relative to the platen by a predetermined amount. In some embodiments, the predetermined amount of rotation is about 43 degrees.

In some embodiments, the printer includes a motor operably coupled to the platen. In some embodiments, the printer includes a temperature sensor configured to sense the temperature of the motor. In some embodiments, the temperature sensor provides closed loop temperature control of the motor.

In yet another aspect, the present disclosure is directed to a printer that includes a housing having a cover and a base connected together with a hinge. The printer includes a latch assembly disposed in the cover. The latch assembly includes a latch lever disposed at least in part on the exterior of the cover in mechanical communication with a first latch tab and a second latch tab. Actuation of the latch lever simultaneously actuates the first and second latch tabs. The base includes first and second openings defined therein to receive the first and second latch tabs respectively. Actuation of the first and second latch tabs, once inserted into the first and second openings, move the latch tabs from a locked position to an unlocked position thus allowing the cover to be disengaged from the base. The printer includes a media centering assembly disposed in the base. The media centering assembly includes a first media guide and a second media guide disposed in slidable opposition to one another and configured to support a roll of media therebetween. The media centering assembly includes a first pulley assembly having a first pulley and a first belt. The first belt is in communication with the first pulley and is operably coupled to the first media guide at a first end of the first belt, and is operably coupled to the second media guide at a second end of the first belt. The media centering assembly includes a second pulley assembly that includes a second pulley and a second belt. The second belt is in communication with the second pulley and is operably coupled to the second media guide at a first end of the second belt, and operably coupled to the first media guide at a second end of the second belt. The media centering assembly includes an extension spring operably coupled to an anchor at a first end of the extension spring, and is operably coupled to the first media guide at a second end of the extension spring and configured to bias the first media guide toward the second media guide.

In some embodiments, the printer includes a first mounting plate disposed on the first media guide, and a second mounting plate disposed on the second media guide. In some embodiments, the first belt is fixed to the first mounting plate at a first end of the first belt, and is fixed to the second mounting plate at a second end of the first belt. The second belt is fixed to the second mounting plate at a first end of the second belt, and is fixed to the first mounting plate at a second end of the second belt. In some embodiments, the first media guide and the second media guide each include a male protrusion configured for insertion into a support tube of a media roll. In some embodiments, the male protrusion is disposed on a reversible member having a first position wherein the male protrusion is configured for insertion into a support tube of a media roll having a first diameter, and a second, reversed position wherein the male protrusion is configured for insertion into a support tube of a media roll having a second diameter different from the first diameter.

BRIEF DESCRIPTION OF THE DRAWINGS

The present subject matter may take form in various components and arrangements of components, and in various steps and arrangements of steps. The appended drawings are only for purposes of illustrating particular embodiments and are not to be construed as limiting the subject matter.

DETAILED DESCRIPTION

Particular embodiments of the present disclosure are described hereinbelow with reference to the accompanying drawings; however, it is to be understood that the disclosed embodiments are merely examples of the disclosure, which may be embodied in various forms. Well-known and/or repetitive functions and constructions are not described in detail to avoid obscuring the present disclosure in unnecessary or redundant detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In addition, as used herein in the description and in the claims, terms referencing orientation, e.g., "top", "bottom", "upper", "lower", "left", "right", and the like, are used with reference to the figures and features shown and described herein. It is to be understood that embodiments in accordance with the present disclosure may be practiced in any orientation without limitation. In this description, as well as in the drawings, like-referenced numbers represent elements which may perform the same, similar, or equivalent functions.

Figure 1:
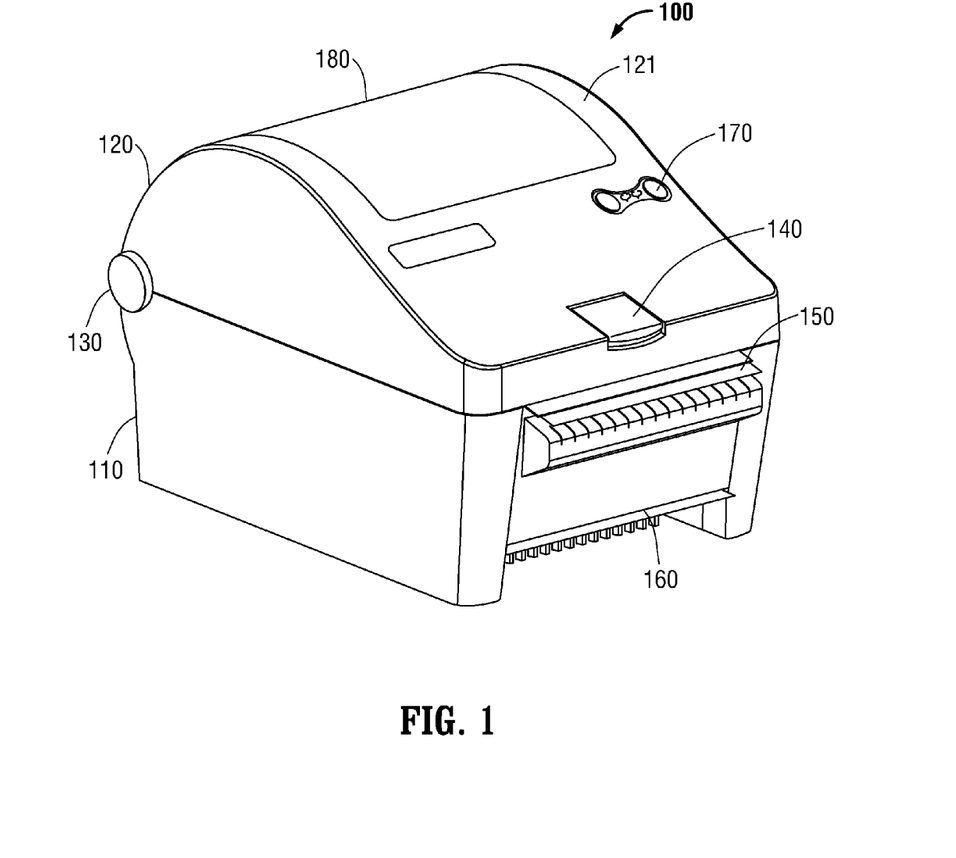
FIG. 1 is a front perspective view of an assembled thermal printer constructed in accordance with an example embodiment of the present disclosure.
Figure 2:
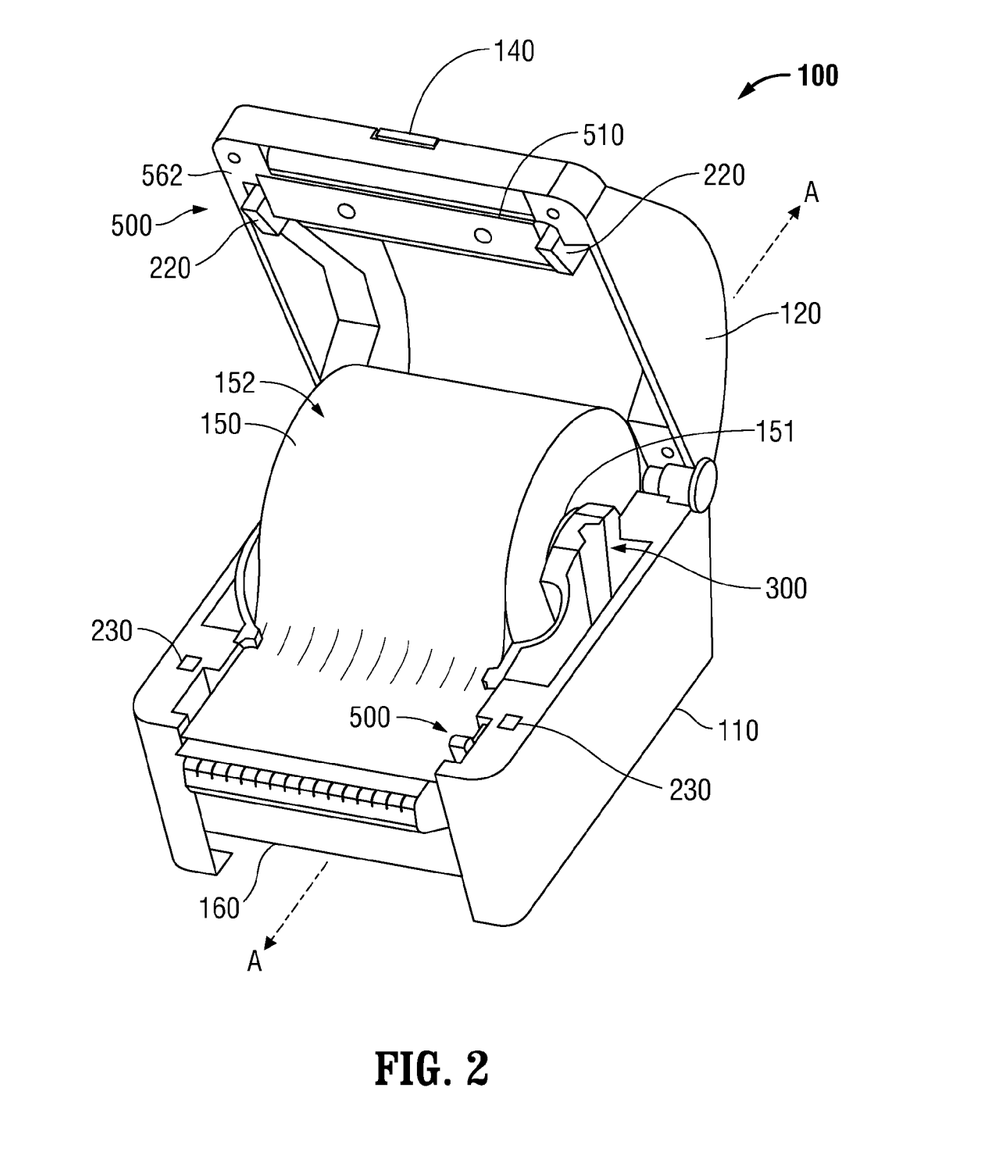
FIG. 2 is a front perspective view of an assembled thermal printer shown with its cover open and constructed in accordance with an example embodiment of the present disclosure.

Turning first to FIGS. 1 and 2, according to aspects of the present disclosure, direct thermal printer 100 includes base 110 and cover 120. Cover 120 is configured for selective engagement with a top portion of base 110 and includes top frame 180, latch lever 140, and latch tabs 220. In the present embodiment, top frame 180 includes an enlarged section of a top surface 121 of cover 120, and is generally configured to allow cover 120 to couple with base 110 without contacting or interfering with the supply of print media 150 disposed within printer 100. Additionally, cover 120 may be hingedly attached to a rear portion of the base at hinge 130. Various structures known in the art to hingedly attach cover 120 to base 110 are also contemplated, for example and without limitation, a conventional hinge-pin arrangement, a living hinge, and so forth. During use, cover 120 may be pivoted or rotated about hinge 130 to enable a user to selectively access the components in base 110, to load and unload media, and the like. A view of printer 100 with cover 120 open and media inserted is shown in FIG. 2.

Latch lever 140 can be mechanically connected to latch tabs 220 which can be disposed on opposing sides of cover 120. Latch tabs 220 can be normally biased for engaging slots 230 located in base 110. Actuation of latch lever 140 can simultaneously actuate latch tabs 220, which overcomes the bias such that latch tabs 220 do not engage slots 230 in base 110 and cover 120 can be pivoted about hinge 130 or separated from base 110. Conversely, the normal bias of latch tabs 220 urges latch tabs 220 to engage a portion of slots 230 thereby securing cover 120 to base 110.

Front plate 160 of base 110 provides an exit surface over which media 150 passes as it exits printer 100. Front plate 160 may be pulled away from base 110 to provide space for the attachment of optional accessories, such as a label peeler and/or a cutter, to base 110.

Printer 100 can be supplied with power from an electrical source (not shown). The electrical source of energy can be AC or DC depending on the desired configuration of printer 100. Switches or buttons 170 can be positioned on the top face of cover 120 and can be in electrical communication with a control circuit (not shown) that is disposed within printer 100. The control circuit can be a printed circuit board or any control circuit known in the art sized to fit in printer 100. Buttons 170 can control operation of printer 100 such as pause, resume, and feed.

Figure 3A:
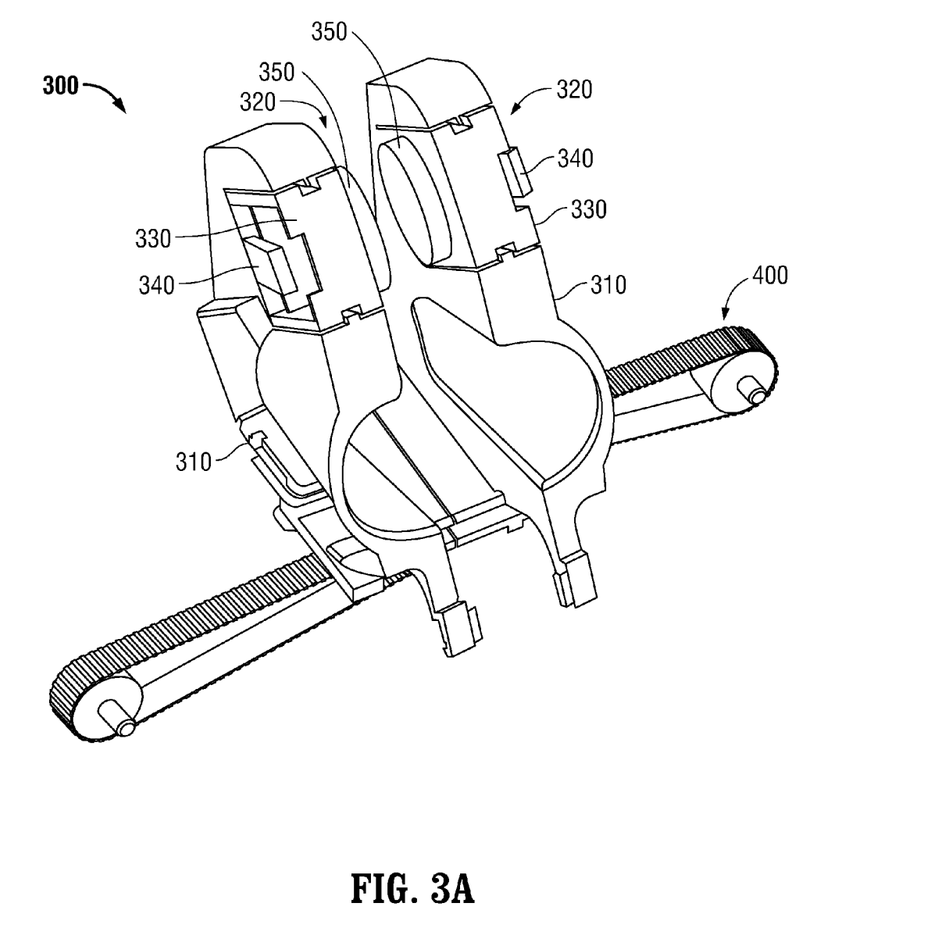
FIG. 3A is a perspective view of the media storage assembly in accordance with an example embodiment of the present disclosure.
Figure 3B:
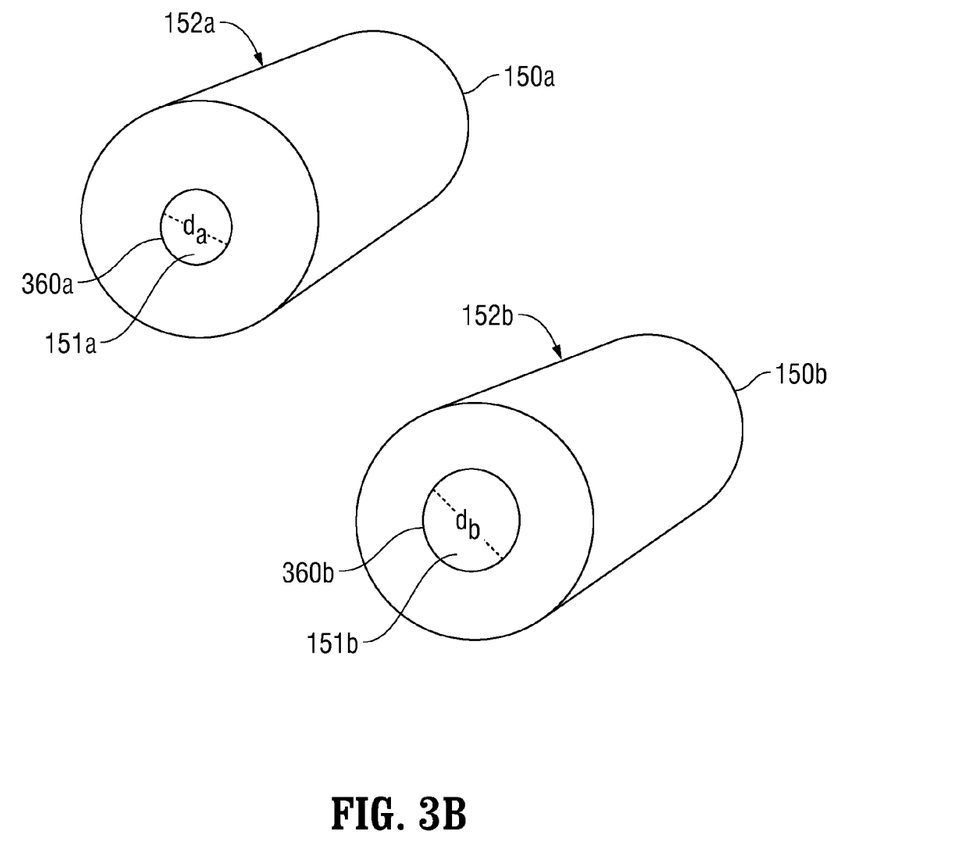
FIG. 3B is a perspective view of exemplary media that may be used in an example embodiment of the present disclosure.
Figure 4:
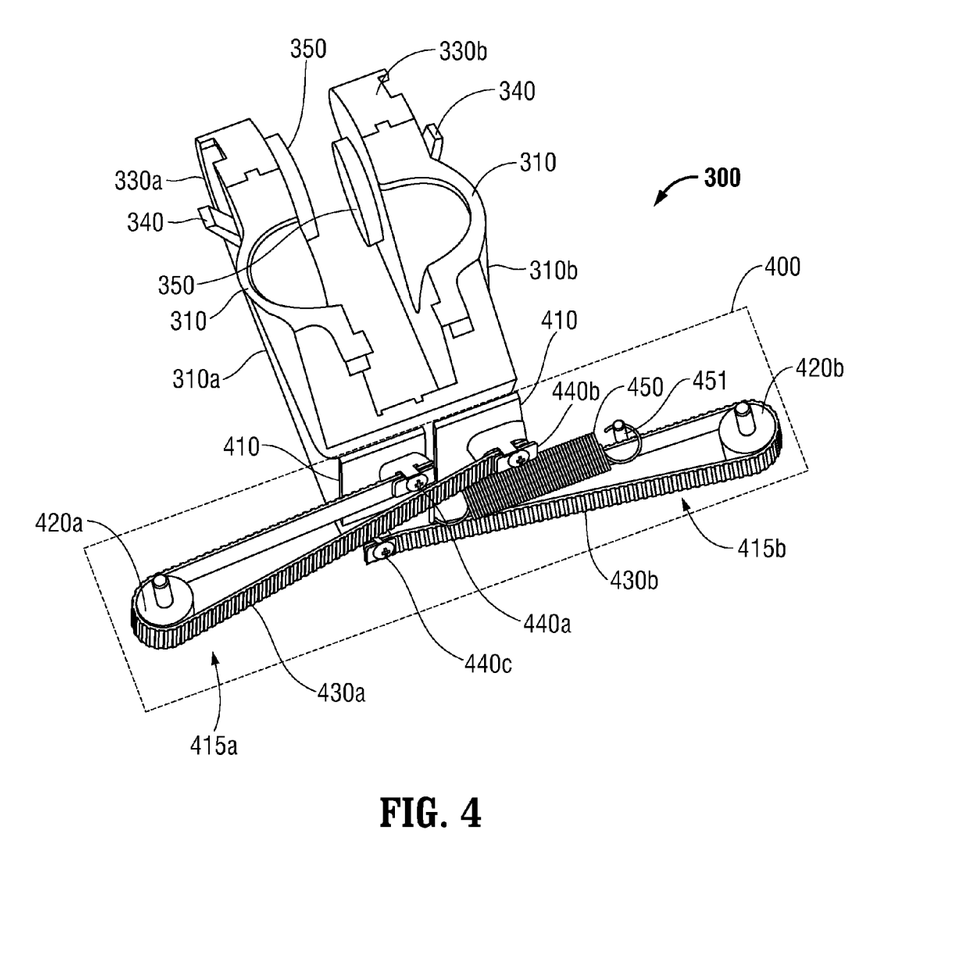
FIG. 4 is a top perspective view of the media centering assembly in accordance with an example embodiment of the present disclosure.

Media storage assembly 300, which can be seen only partially in FIG. 2, is shown in further detail in FIGS. 3A and 4. Media storage assembly 300 includes spaced apart media guides 310 each having tab slots 320 for receiving removable tabs 330 which may be selectively positioned within tab slots 320. Media guides 310 can also include securing tabs 340 for securing removable tabs 330 in tab slots 320. Removable tabs 330 can include disc-shaped male features 350 disposed on the face of removable tabs 330. Male features 350 are adapted for engaging a portion of the inside diameter of media supply roll 152. Various types of media 150 may have an inside diameter of varying sizes. For example, as illustrated in FIG. 3B, media supply roll 152a has an inside diameter 360a of diameter $d_a$, while media supply roll 152b has an inside diameter 360b of diameter $d_b$ that is greater than diameter $d_a$.

Media supply roll 152, media supply roll 152a, and/or media supply roll 152b may include a support tube 151, support tube 151a, and/or support tube 151b, respectively, that engages male feature 350 such that media supply roll 152 is rotatable on male features 350, thereby allowing media 150 to be fed from media supply roll 152 toward printhead 510. Media guides 310 can be repositioned within tab slots 320 to allow for media supply rolls 152 of different inside diameters to fit in printer 100. In a first position in tab slot 340, which is indicated by 330a, removable tab's 330 male feature 350 is in a position to hold media rolls of a certain size, for example, a media supply roll having a width of 1.5 inches. When removable tab 330 is removed, rotated 180 degrees, and reinserted in a second position, which is indicated by 330b, in the tab slot, removable tab's 330 male feature 350 is placed in a position suitable to hold media of another size, for example, 1.0 inches wide.

Turning now to FIG. 4, media centering assembly 400 is shown in further detail. Media centering assembly 400 may include mounting rails (not shown) disposed in base 110, first and second mounting plates 410 disposed on first and second media guides 310, and pulley assemblies 415a and 415b disposed in base 110. Pulley assembly 415a includes pulley 420a and belt 430a. As shown in FIG. 4, belt 430a can be attached to a first mounting plate 410 with fastener 440a and to a second mounting plate 410 with fastener 440b. Pulley assembly 415b includes pulley 420b, belt 430b, and extension spring 450. As shown in FIG. 4, belt 430b is joined to one of mounting plates 410 with fastener 440c and to the other media of mounting plates 410 with another fastener (not shown). Although fasteners are illustrated here, any attaching mechanisms known in the art are contemplated by the present disclosure, including without limitation, threaded fasteners, rivets, clips, adhesive, integral forming, overmolding, intermolding, and so forth. Mounting plates 410 are slidably mounted to the mounting rails (not shown) such that movement of mounting plates 410 and guides 310 is directed in a transverse linear path. Extension spring 450 is disposed between one of mounting plates 410 and an anchor 451 situated on a portion of base 110 that is opposite mounting plate 410, such as the platen bracket (not shown), an interior wall of base 110, or any other suitable position. Extension spring 450 is biased for pulling media guides 310a, 310b towards each other.

During use, in order to insert a media roll 152 on male features 350, a user pushes apart media guides 310 thus extending extension spring 450 to overcome the bias thereof. After media roll 152 is positioned on media guides 310, e.g., male features 350 are inserted into support tube 151 of media roll 15, the user releases media guides 310, which, in turn, causes extension spring 450 to contract, thus allowing the media guides 310 to pull towards each other and thereby hold media roll 152 in place. Advantageously, the interaction of belt 430a and pulley 420a with left media guide 310a and right media guide 310b, the interaction of belt 430b and pulley 420b with left media guide 310a and right media guide 310b, together with the inward bias of extension spring 450, enables media guides 310 to move in a reciprocal manner about the centerline A-A (FIG. 2) of printer 100, which, in turn, enables media guides 310 to retain media roll 152 in a centered position relative to printhead 510. In this manner, centering of the print media roll 152 may be achieved without the bulk and friction typically encountered with conventional rack and pinion arrangements.

Print assembly 500, which is shown partially in FIG. 2, is disposed within base 110 and/or within cover 120. A portion of print assembly 500 that may be disposed in cover 120 includes inner cover 562, compliant members (such as compression springs—not shown) and printhead 510. Inner cover 562 and compliant members can retain printhead 510 providing limited radial movement of printhead 510 along printhead 510's axis.

Figure 5:
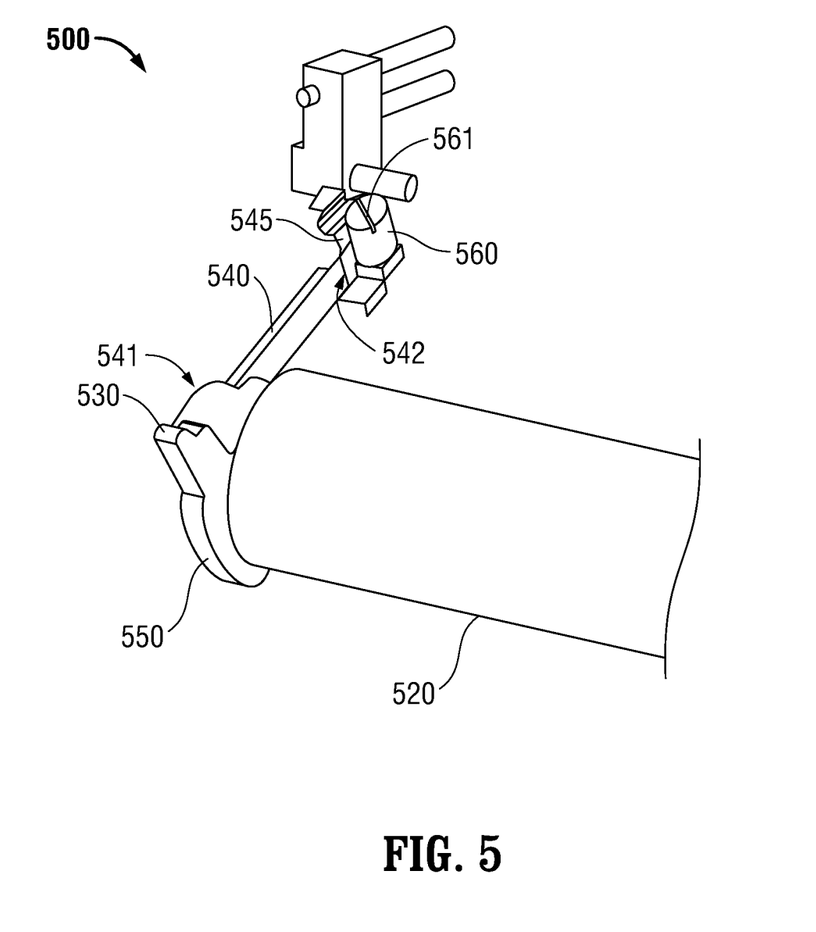
FIG. 5 is a perspective view of the portion of the print assembly including a portion of the platen and the cam located at one end of the platen constructed in accordance with an example embodiment of the present disclosure.

The portion of print assembly 500 is shown in further detail in FIG. 5. Bearing 550 retains platen 520 and facilitates axial rotation of platen 520 along a longitudinal axis thereof. A cam 530 is disposed at each end of platen 520. An adjustment set screw 560 is disposed in base 110. Leaf spring 540 is disposed at a first end 541 on the bearing 550 and at a second end 542 in slot 545. When positioned in slot 545, leaf spring 540 contacts a set screw 560. Rotation of set screw 560 engages leaf spring 540, which, in turn, rotates cam 530. As cam 530 rotates, printhead 510 is translated in a longitudinal direction (e.g., along axis A-A). In this manner, the position of printhead 510 may be adjusted to achieve optimal printing. Set screw 560 includes a tool engaging feature 561, such as a slot, Phillips head, Pozidrive head, hex head, Torx head, and the like to facilitate the adjustment thereof with a screwdriver or other suitable tool. In some embodiments, set screw 560 may be knurled to enable adjustment using only the fingers. Leaf spring 540 is biased inward, e.g., toward platen 520, to retain platen 520 in association with bearing 550. During use, leaf spring 540 may be deflected in a transverse direction away from platen 540 (e.g., orthogonal to axis A-A) to allow leaf spring 540 to move out of its anchor position in base 110. Once bearing 550 is rotated a predetermined amount, for example, about 43 degrees, bearing 550 may be removed from the platen bracket (not shown) to facilitate the removal and replacement of platen 520, bearing 550, leaf spring 540 and/or set screw 560.

Figure 6:
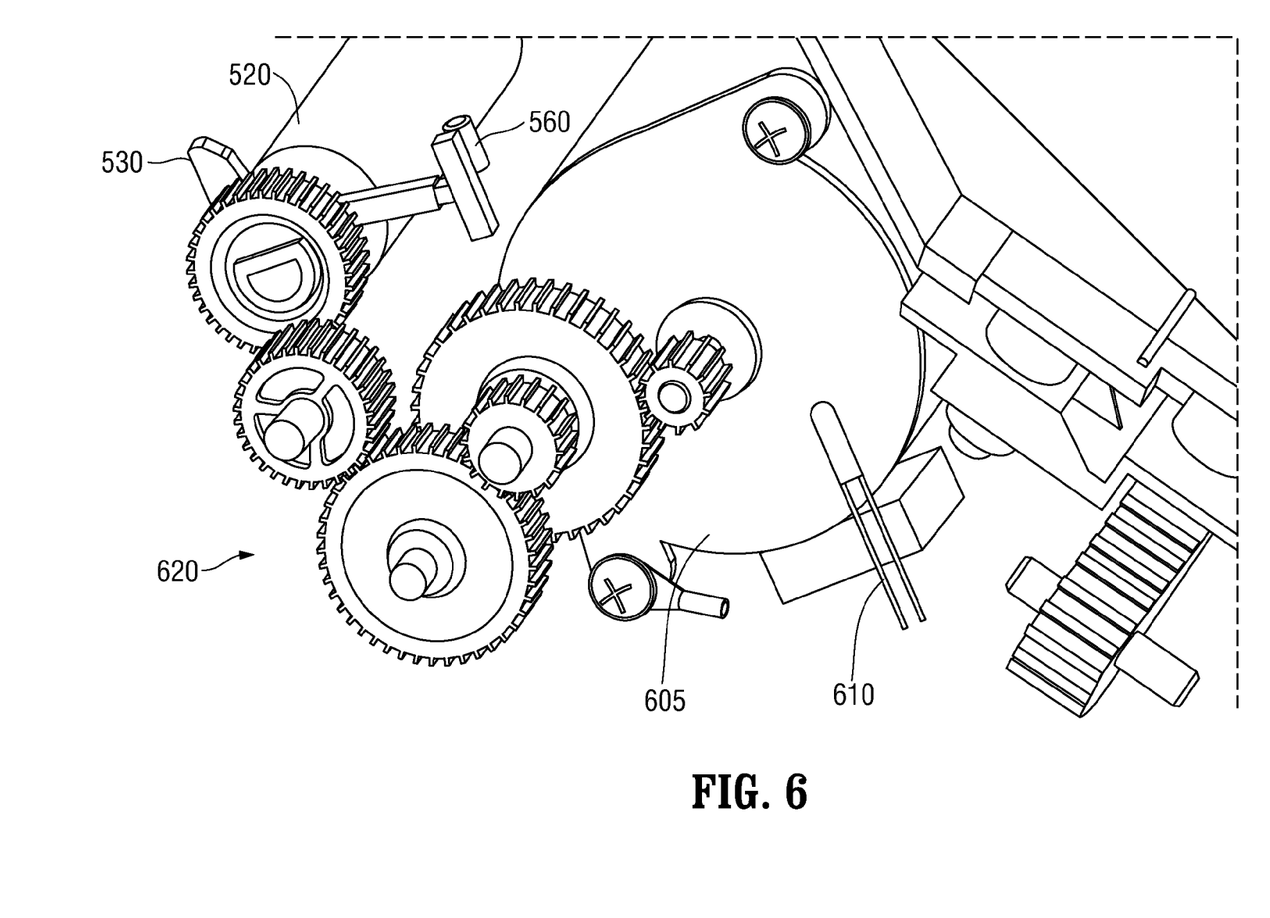
FIG. 6 is a side perspective view of the portion of the print assembly including a portion of the platen and the cam located at one end of the platen, the drive train, and a temperature sensing member constructed in accordance with an example embodiment of the present disclosure.

Printer 100 also includes motor 605 as shown in FIG. 6. Motor 605, which may be a stepper motor, a DC motor, an AC motor, or any suitable motor now or in the future known, is operatively coupled to platen roller 520 via drive train 620 such that a full step of motor 605 corresponds to a predetermined length of media 150 movement. Temperature sensor 610, which may include a thermistor, and drive train 620, are shown in FIG. 6. Temperature sensor 610 is disposed in base 110 and is configured to sense and/or monitor the temperature of motor 605, providing closed loop temperature control of motor 605 which, in turn, allows printer 100 to run at higher duty cycles and protect the printer 100 and/or motor 605 from overheating.

Figure 7:
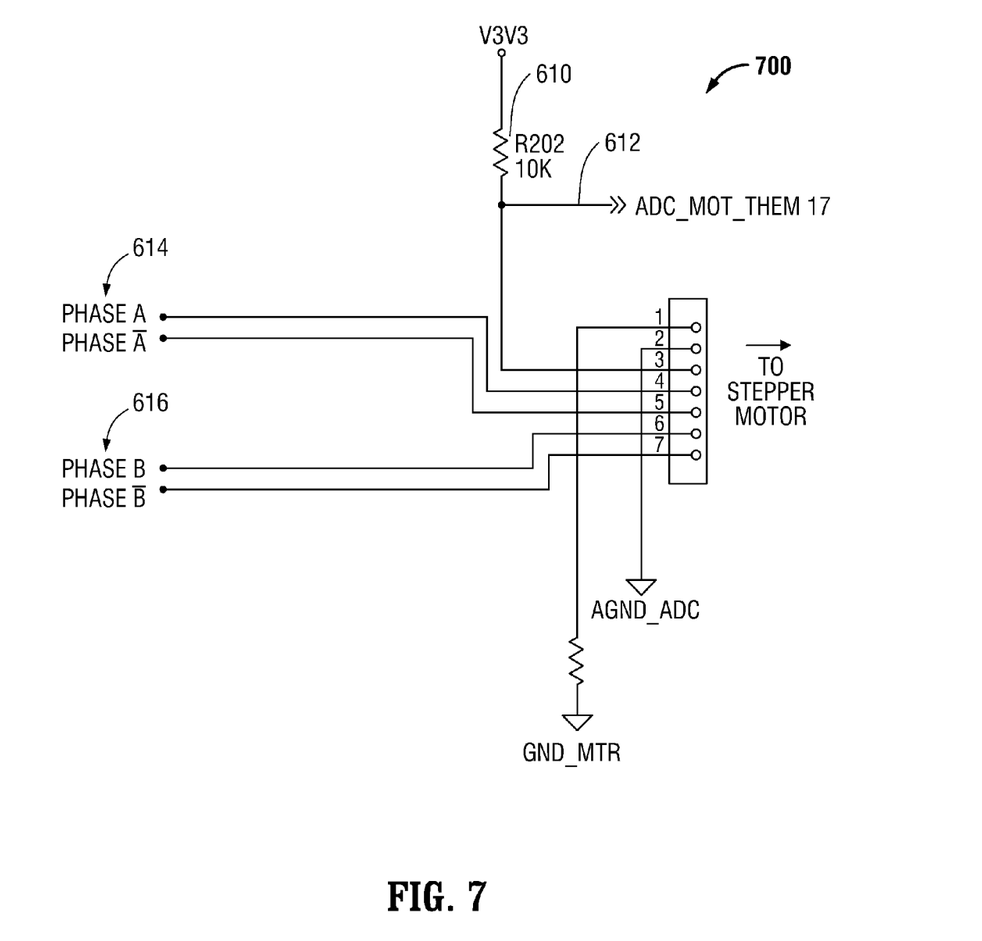
FIG. 7 is a circuit drawing of the temperature sensing member constructed in accordance with an example embodiment of the present disclosure.

FIG. 7 shows a stepper motor interface 700 which illustrates the electrical connections of the temperature sensor 610 to an analog-to-digital converter (ADC) input 612 of the printer controller (not shown), which is used to determine motor temperature. In the illustrated embodiment, motor 605 employs a four-wire arrangement in which the relative timing of the phase A 614 and phase B 616 motor drive signals, as provided by the controller, determines the rotational output of motor 605 and thus, the advancement of media 150.

The described embodiments of the present disclosure are intended to be illustrative rather than restrictive, and are not intended to represent every embodiment of the present disclosure. Further variations of the above-disclosed embodiments and other features and functions, or alternatives thereof, may be made or desirably combined into many other different systems or applications without departing from the spirit or scope of the disclosure as set forth in the following claims both literally and in equivalents recognized in law.

What is claimed is:

1. A media centering assembly, comprising:
   a first media guide and a second media guide disposed in slidable opposition to one another and configured to support a roll of media therebetween;
   a first pulley assembly including a first pulley and a first belt, the first belt disposed in communication with the first pulley and operably coupled to the first media guide at a first end of the first belt and operably coupled to the second media guide at a second end of the first belt;
   a second pulley assembly including a second pulley and a second belt, the second belt disposed in communication with the second pulley and operably coupled to the second media guide at a first end of the second belt and operably coupled to the first media guide at a second end of the second belt; and
   an extension spring operably coupled to an anchor at a first end of the extension spring and operably coupled to the first media guide at a second end of the extension spring and configured to bias the first media guide toward the second media guide.

2. The media centering assembly in accordance with claim 1, further comprising:
   a first mounting plate disposed on the first media guide; and
   a second mounting plate disposed on the second media guide.

3. The media centering assembly in accordance with claim 2, wherein the first belt is fixed to the first mounting plate at a first end of the first belt and fixed to the second mounting plate at a second end of the first belt, and wherein the second belt is fixed to the second mounting plate at a first end of the second belt and fixed to the first mounting plate at a second end of the second belt.

4. The media centering assembly in accordance with claim 1, wherein the first media guide and the second media guide each include a male protrusion configured for insertion into a support tube of a media roll.

5. The media centering assembly in accordance with claim 4, wherein the male protrusion is disposed on a reversible member having a first position wherein the male protrusion is configured for insertion into a support tube of a media roll having a first diameter, and a second, reversed position wherein the male protrusion is configured for insertion into a support tube of a media roll having a second diameter different from the first diameter.

6. The media centering assembly in accordance with claim 5, wherein the first media guide and the second media guide include a tab slot defined therein, and wherein the reversible member includes a tab configured to selectively engage the tab slot of the corresponding first or second media guide.

7. A printer comprising:
   a housing including a cover and a base connected together with a hinge;
   a latch assembly disposed in the cover, the latch assembly including a latch lever disposed at least in part on the exterior of the cover in mechanical communication with a first latch tab and a second latch tab such that actuation of the latch lever simultaneously actuates the first and second latch tabs;

first and second openings defined in the base adapted to receive the first and second latch tabs respectively, wherein after insertion into the first and second openings, actuation of the first and second latch tabs moves the latch tabs from a locked position to an unlocked position allowing selective disengagement of the cover from the base;

a print assembly disposed in the housing, the print assembly including:
    a bearing disposed in the base,
    an elongated cylindrical platen rotatable about longitudinal axis thereof and disposed in the base, the platen being retained by the bearing which facilitates rotation of the platen along the platen's longitudinal axis;
    a first cam disposed on a first end of the platen; and
    a temperature sensor disposed in the base.

8. The printer in accordance with claim 7, further comprising:
a second cam disposed on a second end of the platen;
a set screw disposed in the base; and
a leaf spring disposed on the second bearing and in contact with the set screw, wherein rotation of the set screw rotates the first and second cams and wherein the rotation of the first and second cams initiates contact with the first and second cams with a printhead.

9. The printer in accordance with claim 8, wherein the base includes an anchor slot defined therein configured to receive a portion of the leaf spring.

10. The printer in accordance with claim 9, wherein the leaf spring is configured for deflection in a transverse direction away from the platen to enable the leaf spring disengage from the anchor slot.

11. The printer in accordance with claim 7, wherein the bearing is rotatable relative to the platen by a predetermined amount to facilitate selective removal of the platen from the bearing.

12. The printer in accordance with claim 11, wherein the predetermined amount of rotation is about 43 degrees.

13. The printer in accordance with claim 7, further comprising a motor operably coupled to the platen.

14. The printer in accordance with claim 13, wherein the temperature sensor is configured to sense the temperature of the motor.

15. The printer in accordance with claim 14, wherein the temperature sensor provides closed loop temperature control of the motor.

16. A printer comprising:
a housing including a cover and a base connected about a hinge;
a latch assembly disposed in the cover, the latch assembly including a latch lever disposed at least in part on the exterior of the cover in mechanical communication with a first latch tab and a second latch tab such that actuation of the latch lever simultaneously actuates the first and second latch tabs;
first and second openings defined in the base adapted to receive the first and second latch tabs respectively, wherein after insertion into the first and second openings actuation of the first and second latch tabs moves the latch tabs from a locked position to an unlocked position allowing selective engagement of the cover from the base; and
a media centering assembly disposed in the base, including:
    a first media guide and a second media guide disposed in slidable opposition to one another and configured to support a roll of media therebetween;
    a first pulley assembly including a first pulley and a first belt, the first belt in communication with the first pulley and operably coupled to the first media guide at a first end of the first belt and operably coupled to the second media guide at a second end of the first belt;
    a second pulley assembly including a second pulley and a second belt, the second belt in communication with the second pulley and operably coupled to the second media guide at a first end of the second belt and operably coupled to the first media guide at a second end of the second belt; and
    an extension spring operably coupled to an anchor at a first end of the extension spring and operably coupled to the first media guide at a second end of the extension spring and configured to bias the first media guide toward the second media guide.

17. The printer in accordance with claim 16, further comprising:
a first mounting plate disposed on the first media guide; and
a second mounting plate disposed on the second media guide.

18. The printer in accordance with claim 17, wherein the first belt is fixed to the first mounting plate at a first end of the first belt and fixed to the second mounting plate at a second end of the first belt, and wherein the second belt is fixed to the second mounting plate at a first end of the second belt and fixed to the first mounting plate at a second end of the second belt.

19. The printer in accordance with claim 16, wherein the first media guide and the second media guide each include a male protrusion configured for insertion into a support tube of a media roll.

20. The printer in accordance with claim 19, wherein the male protrusion is disposed on a reversible member having a first position wherein the male protrusion is configured for insertion into a support tube of a media roll having a first diameter, and a second, reversed position wherein the male protrusion is configured for insertion into a support tube of a media roll having a second diameter different from the first diameter.

* * * * *